United States Patent
Tsou et al.

(10) Patent No.: US 8,618,214 B2
(45) Date of Patent: Dec. 31, 2013

(54) FIBER-REINFORCED POLYPROPYLENE/ELASTOMER COMPOSITE

(75) Inventors: Andy Haishung Tsou, Allentown, PA (US); John Henry Dunsmuir, Flemington, NJ (US); Donald Andrew Winesett, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 48 days.

(21) Appl. No.: 12/971,454

(22) Filed: Dec. 17, 2010

(65) Prior Publication Data

US 2012/0157631 A1 Jun. 21, 2012

(51) Int. Cl.
*C08L 53/02* (2006.01)
*C08J 5/06* (2006.01)
*C08L 23/26* (2006.01)

(52) U.S. Cl.
USPC ............ 525/63; 525/70; 525/98; 525/190; 525/192; 525/240

(58) Field of Classification Search
USPC .................. 525/70, 240, 63, 98, 190, 192
See application file for complete search history.

(56) References Cited

U.S. PATENT DOCUMENTS

| | | | |
|---|---|---|---|
| 4,717,742 | A | 1/1988 | Beshay |
| 2007/0099792 | A1 | 5/2007 | Khabashesku et al. |
| 2010/0113696 | A1 | 5/2010 | Khabashesku et al. |

FOREIGN PATENT DOCUMENTS

| | | | |
|---|---|---|---|
| EP | 0578043 | | 1/1994 |
| EP | 0663418 | | 3/1999 |
| JP | 2010-248842 | * | 11/2010 |
| WO | 8605445 | | 9/1986 |
| WO | 2004035295 | | 4/2004 |
| WO | 2006116547 | A1 | 11/2006 |

OTHER PUBLICATIONS

Mitsuji et al., Partial electronic translation of JP2010248482 (Nov. 2010).*

S. Akbar, E. Beyou, P. Cassagnau, P. Chaumont and G. Farzi, "Radical grafting of polyethylene onto MWCNTs: A model compound approach", Polymer 50 (2009), 2535-2543.

A. De La Vega Oyervides, J. Bonilla Rios, L. F. Ramos De Valle, L. A. S. De Almeida Prado and Karl Schulte, Peroxide assisted coupling and characterization of carbon-nanofiber-reinforced poly(propylene) composites, Macromolecular Materials and Engineering (2007), 292(10-11), 1095-1102.

L. Hong-Wei, G. Xu-Xhan, T. Yan, L. Rui-Xia and W. Da-Cheng, "Structure characterization of polypropylene grafted multi-wall carbon nanotubes", Sichuan Daxue Xuebao (Gongcheng Kexue Ban)/ Journal of Sichuan University (Engineering Science Edition), Nov. 2006, vol. 38, No. 6, pp. 88-91.

L. Valenti, J. Biagiotti, J.M. Kenny and M.A. Lopez Manchado, "Physical and mechanical behavior of single-walled carbon nanotube/polypropylene/ethylene-propylene-diene rubber nanocomposites", Journal of Applied Polymer Science (Jun. 19, 2003), vol. 89, No. 10, pp. 2657-2663.

K. Enomoto, T. Yasuhara and N. Ohtake, "Mechanical properties of injection-molded composites of carbon nanofibers in polypropylene matrix", New Diamond and Frontier Carbon Technology (2005), vol. 15, No. 2, pp. 59-72.

D. McIntosh, V.N. Khabashesku and E.V. Barrera, "Benzoyl peroxide initiated in situ functionalization, processing, and mechanical properties of single-walled carbon nanotube-polypropylene composite fibers", Journal of Physical Chemistry (2007), 111(4), 1592-1600.

Z. Xiangwen, X. Guoping, Z. Yuefeng, L. Ji, D. Jianling and Y. Suyuan, "Polypropylene composites having carbon nanotubes and powder styrene-butadiene rubber", Qinghua Daxue Xuebao/Journal of Tsinghua University, Dec. 2008, vol. 48, No. 12, pp. 2102-2105.

\* cited by examiner

*Primary Examiner* — Jeffrey Mullis
(74) *Attorney, Agent, or Firm* — Robert A. Migliorini

(57) ABSTRACT

Provided is a fiber-reinforced composite. The composite has a propylene polymer including 90 wt % or more of propylene monomeric units based on the weight of the propylene polymer; a plurality of fibers of a solid, flexible material grafted to the propylene polymer; and an elastomer. The fibers are present in the composite at 10 wt % to 80 wt % based on the total weight of the composite. The propylene polymer is present in the composite at from 30 wt % to 95 wt % based on the total weight of the composite. The elastomer is present in the composite at from 5 wt % to 50 wt % based on the total weight of the composite. Greater than 50 wt % of the fibers are dispersed within the propylene polymer based on the total weight of the fibers in the composite. There is also provided a process for making a fiber-reinforced composite.

21 Claims, No Drawings

FIBER-REINFORCED POLYPROPYLENE/ELASTOMER COMPOSITE

FIELD

The present disclosure relates to a fiber-reinforced composite. The present disclosure further relates to a fiber-reinforced composite having a plastic phase and an elastomer phase.

BACKGROUND

Polypropylene and polypropylene-based materials are commonly employed in structural applications in automobiles. Physical properties that are important in selecting and engineering such materials include stiffness, toughness, dimensional stability, heat distortion temperature, and surface smoothness.

Presently, there are no polypropylene-based materials available that can deliver good performance in fulfilling most or all of the physical properties simultaneously in meeting the needs for structural automotive applications.

One means of addressing the performance needs of polypropylene-based materials in structural automotive applications is to introduce elastomers or talc into the materials to enhance toughness and improve surface finish and paintability. However, introduction of elastomers may diminish heat distortion temperature resistance and dimensional stability.

Another means of addressing the performance needs of polypropylene-based materials in structural automotive applications is to introduce fibers, such as glass fibers, into the materials so as to form a composite. Introduction of high levels, e.g., ≥30 wt %, of such fibers enhances stiffness, dimensional stability and heat distortion temperature resistance of polypropylene-based materials. However, polypropylene-based materials having high levels of fibers, particularly those having diameters of 0.1 mm or more or that are long, are very difficult to process and frequently result in non-uniform fiber concentration. Additionally, polypropylene-based materials having high levels of fibers can be brittle and have a poor surface finish, which prevents them from being used as outside panels. The presence of long glass fibers can also prevents the addition of elastomers into these materials for toughness enhancement.

Another means of addressing the performance needs of polypropylene-based materials in structural automotive applications is to use multi-layer laminates. One layer provides stiffness, dimensional stability, and heat distortion temperature performance while another surface layer of different composition provides surface smoothness, paintability, and impact toughness. However, the use of multilayer laminates adds additional cost due to more complex manufacturing. It would be very desirable to have a polypropylene-based material that would satisfy all performance requirements such it could be used in a single layer.

SUMMARY

According to the present disclosure, there is provided a fiber-reinforced composite. The composite has a propylene polymer including 90 wt % or more of propylene monomeric units based on the weight of the propylene polymer; a plurality of fibers of a solid, flexible material grafted to the propylene polymer; and an elastomer exhibiting a glass transition temperature of less than 0° C. The fibers are present in the composite at from 10 wt % to 80 wt % based on the total weight of the composite. The propylene polymer is present in the composite at from 30 wt % to 95 wt % based on the total weight of the composite. The elastomer is present in the composite at from 5 wt % to 50 wt % based on the total weight of the composite. Greater than 50 wt % of the fibers is dispersed within the propylene polymer based on the total weight of the fibers in the composite.

Further according to the present disclosure, there is provided a process for making a fiber-reinforced composite. The process has the steps of (a) admixing a plurality of fibers of a solid, flexible material into a melt of a propylene polymer including 90 wt % or more of propylene monomeric units based on the weight of the propylene polymer; (b) grafting in the presence of an organic peroxide greater than 50 wt % of the plurality of fibers to the propylene polymer to form a first melt mixture; (c) admixing the melt mixture to an amount of a melt of an elastomer exhibiting a glass transition temperature of less than 0° C. to form a second melt mixture; and (d) cooling the second melt mixture to form the composite. The fibers are present in the composite at 10 wt % to 80 wt % based on the total weight of the composite. The propylene polymer is present in the composite at from 30 wt % to 95 wt % based on the total weight of the composite. The elastomer is present in the composite at from 5 wt % to 50 wt % based on the total weight of the composite. Greater than 50 wt % of the fibers is dispersed within the propylene polymer based on the total weight of the fibers in the composite.

DETAILED DESCRIPTION

All numerical values within the detailed description and the claims herein are modified by "about" or "approximately" the indicated value, and take into account experimental error and variations that would be expected by a person having ordinary skill in the art.

The disclosure discloses a process for preparing nano- and micro-fiber reinforced propylene polymer/elastomer composites. The composites are useful in structural applications, particularly automotive applications. The process produces propylene polymer/elastomer composites with relatively greater fiber phase partition in the plastic phase and reduced fiber phase partition into the elastomer phase. This process achieves relatively greater fiber phase partition in the plastic phase and reduced fiber phase partition into the elastomer phase by pre-dispersing fibers in polypropylene master batches along an injection of peroxide solution to effect radical grafting of the propylene polymer onto surface-treated or untreated fibers for better dispersion and fixation of fibers in the plastic phase.

The plastic phase or domains of the composite has a propylene polymer of high propylene monomeric content, i.e., 90 wt % or more of propylene monomeric units based on the weight of the propylene polymer. Preferably, the propylene polymer has 95 wt % or more of propylene monomeric units. A preferred propylene polymer is polypropylene. A preferred polypropylene is an isotactic polypropylene. The propylene polymer will be adapted to graft to microfibers and nanofibers via peroxide-initiated grafting.

The elastomer phase or domains of the composite has an elastomer having a glass transition temperature of less than 0° C. as measure by DSC (Differential Scanning calorimetry). Useful elastomers include diene-rubbers, such as styrene-butadiene rubber (SBR), cis-butadiene rubber (BR), natural rubber (NR); polyolefin plastomers, such as ethylene-butene, ethylene-hexene, and ethylene-octene plastomers; polyolefin elastomers, such as propylene-ethylene, propylene-hexene, ethylene-octene elastomers; and thermoplastic elastomers (TPE), such as hydrogenated styrene-butadiene (or isoprene) block copolymers, polyester, and polyamide TPE; and combinations of two or more of the foregoing. Optionally, compatibilizers can be incorporated into the elastomer to deliver finer elastomer dispersions. Useful compatibilizers include di-block copolymer polypropylene, such as poly(propylene-b-ethylene-co-propylene).

Micro- and nano-fibers useful in the composites of the present disclosure are of a flexible solid material and can be any known in the art. Examples include, but are not limited to, glass, magnesium oxysulfate whiskers, wollastonite calcium metasilicate fibers, halloysite aluminosilicate nanotubes, carbon nanofibers (CNF), multi-walled carbon nanotubes (MWNT), single-wall carbon nanotubes (SWNT), exfoliated graphites, graphenes, and combinations of two or more of the foregoing.

The amount of fibers used in the composite will vary depending on desired physical properties and performance characteristics. Typically, fibers are present in the composite at 10 wt % to 80 wt % based on the total weight of the composite. More typically, the fibers are present in the composite at from 15 wt % to 60 wt %. Yet more typically, the fibers are present in the composite at from 20 wt % to 50 wt %.

To obtain desirable performance physical performance characteristics in the composite, a majority of the fibers by weight should be present in the plastic phase or domain of the composite compared to the elastomer phase or domains. In the composite, greater than 50 wt % of the fibers by weight is dispersed within the propylene polymer phase based on the total weight of the fibers in the composite. Preferably, 80 wt % or more of the fibers are dispersed within the propylene polymer phase.

Useful fibers have a diameter of 1 nanometer (nm) to 5 microns. A preferred diameter is 5 nm to 1 micron. Useful fibers preferably exhibit an L/D ratio of 30 or more and more preferably 30 to 1,500.

Radical graft polymerization of the propylene polymer to the fibers is carried out in the presence of an organic peroxide initiator. The peroxide initiator can be either in the solid or liquid form. To improve the feed consistency, the peroxide can be diluted with paraffinic or aromatic oils of low boiling points, particularly those having boiling points below 180° C. The low boiling points of the oils ensure their complete removal in extruders running at extrusion temperatures >180° C. The organic peroxide is typically employed at from 0.01% to 5 wt % relative to the weight of the propylene polymer. The solution or solid of the organic peroxide initiator is typically added into the extruder directly after the introduction of propylene polymer and fibers during or after admixture of the batch.

The radical grafting is carried out at a temperature of 150° C. to 250° C. and preferably 170° C. to 230° C. The radical grafting is carried out for a residence time of 10 seconds to 150 seconds and preferably 20 seconds to 120 seconds. The organic peroxide initiator is heat activated (homolysis) at the grafting temperatures leading to the formation of the peroxide radicals. Subsequent radical scission of propylene polymers then generates propylene polymer radicals. Both peroxide radicals and propylene polymer radicals could then attach onto the fiber surfaces through radical addition as described in the paper by S. Akbar, E. Beyou, P. Cassagnau, P. Chaumont, and G. Farzi, Polymer, 50(2009), 2535-2543.

Suitable organic peroxides include benzoyl peroxide, 1,4-dichlorobenzyl peroxide, 2,4-dichlorobenzyl peroxide, di-t-butyl peroxide, dicumyl peroxide, tertiary butyl-perbenzoate, and monochlorobenzoyl peroxide, ditertiary-butyl peroxide, 2,5-bis-(tertiarybutyl-peroxy)-2,5-dimethylhexane, 1,1-bis(t-butylperoxy)-3,3,5-trimethylcyclohexane, tertiary-butyl-trimethyl peroxide, tertiary-butyl-tertiary-butyl-tertiary-triphenyl peroxide, t-butyl perbenzoate, and combinations of two or more of the foregoing.

Optionally, the fibers may be surface-treated prior to radical grafting with the use of vinyl-silane coupling agents. Suitable silane-based coupling agents include, for example, chlorosilane, alkoxysilane, silazane, and specific silylizing agents. Examples include methyltrichlorosilane, dimethyldichlorosilane, trimethylchlorosilane, phenyltrichlorosilane, diphenyldichlorosilane, tetramethoxysilane, methyltrimethoxysilane, dimethyldimethoxysilane, ethyltrimethoxysilane, propyltrimethoxysilane, phenyltrimethoxysilane, diphenyldimethoxysilane, tetraethoxysilane, methyltriethoxysilane, dimethyldiethoxysilane, ethyltriethoxysilane, propyltriethoxysilane, phenyltriethoxysilane, diphenyldiethoxysilane, butyltrimethoxysilane, butyltriethoxysilane, isobutyltrimethoxysilane, hexyltrimethoxysilane, octyltrimethoxysilane, decyltrimethoxysilane, hexadecyltrimethoxysilane, trimethyltrimethoxysilane, hexamethyldisilazane, N,O-(bistrimethylsilyl)acetamide, N,N-bis(trimethylsilyl)urea, tert-butyldimethylchlorosilane, vinyltrichlorosilane, vinyltrimethoxysilane, vinyltriethoxysilane, vinyltriacethoxysilane, γ-methacryloxypropyltrimethoxysilane, β-(3,4-epoxycyclohexyl)ethyltrimethoxysilane, γ-glycydoxypropyltrimethoxysilane, γ-glycydoxypropyltriethoxysilane, γ-glycydoxypropylmethyldiethoxysilane, γ-mercaptopropyltrimethoxysilane, γ-chloropropyltrimethoxysilane, and combinations of two or more of the foregoing.

The silane surface treatment requires the formation of stable condensation siloxane products which could be obtained on the surface of siliceous fillers and of fillers based on oxides of aluminum, zirconium, tin, titanium, and nickel. Less stable bonds are formed with oxides of boron, iron, and carbon. Fibers of alkali metal oxide compositions do not form stable bonds with silane coupling agent and are not amenable for coupling agent treatment. For silicate-type fibers, solutions of silane coupling agents having 5 wt % to 30 wt % of coupling agent, preferably ethanol-based solutions, are applied to the fiber surfaces and allowed to stand for more than 5 minutes. Afterward, the treated fibers are dried at 100° C. to 120° C. for 10 minutes to 60 minutes.

The composites of the present disclosure can be engineered to meet physical properties and performance specifications as structural materials in diverse industrial applications, such as automotive and building construction. Physical properties that are important in selecting and engineering such materials include stiffness, toughness, dimensional stability, heat distortion temperature, and surface smoothness. The composites are adapted to meeting performance specifications in some or all of the properties simultaneously.

The following are examples of the present disclosure and are not to be construed as limiting.

EXAMPLES

Fiber-reinforced polypropylene/elastomer composites of the present disclosure were prepared by pre-mixing fibers and polypropylene with grafting between the fibers and the polypropylene. The composites were then subsequently analyzed with atomic force microscopy (AFM) for the presence of filler in the elastomer phase. Fiber-reinforced polypropylene/elastomer composites were prepared by direct mixing of all ingredients without grafting between the fibers and the polypropylene and tested for purposes of comparison.

Examples 1 to 6

Plasticyl (Nanocyl), an iPP (isotactic polypropylene) master batch of 20 wt % MWNT, MOS-Hige (Mitsui), an iPP master batch of 70% magnesium oxysulfate (MOS) fiber whiskers, XG Graphene (XG Sciences), an iPP master batch of 20 wt % graphene, and Pleximer (Naturalnano), and an iPP master batch of 30 wt % Halloysite (aluminosilicate nanotubes) were four master batches obtained from the manufacturers. The master batches for B4 and B5 were prepared by extrusion mixing of PR-24 CNF (Applied Sciences) and Aspect 3992 (Nyco) Wollastonite (calcium metasilicate fibers), respectively, with F1000HC (Sonoco) iPP in a Coperion ZSK-30 twin-screw extruder at 200° C. and 300 RPM, All the master batches, whether obtained from the manufacturers or obtained by extrusion mixing, were in pellet form.

Pellets of one PP master batch were first dry-blended with F1000HC PP pellets and MDV 91-9 elastomer pellets before the resulting dry blend was charged into a Brabender internal mixer at 200° C. at 60 RPM for 5 minutes. MDV 91-9 (ExxonMobil Chemical) is an ethylene-propylene elastomer with 60% ethylene. The blend concentration for B1-B6 examples is 5 wt % filler, 15 wt % MDV91-9, and 80 wt % iPP. After discharge from the Brabender mixer, all samples were then homogenized using a DSM twin-screw miniature extruder for 3 minutes at 200° C. before being injection-molded into tensile bars for testing. One tensile bar from each example was cryo-faced using a cryo-microtome at −120° C. to prepare a surface for tapping-phase AFM evaluations of compound morphology. Judging from the AFM images, a majority of the fillers, >80%, appeared inside the polypropylene matrix and only few percent, <20%, appeared in the elastomer domains. The results are set forth in Table 1.

TABLE 1

(Composites for Examples 1 to 6)

| Examples | PP Master Batch | Elastomer | Filler in elastomer phase |
|---|---|---|---|
| 1 | Plasticyl: 20% MWNT in iPP | MDV91-9 | Few |
| 2 | MosHIGE: 70% MOS fiber in iPP | MDV91-9 | Few |
| 3 | XG Graphene: 20% graphene in iPP | MDV91-9 | Few |
| 4 | 30% PR24 CNF in F1000HC | MDV91-9 | Few |
| 5 | 30% Aspect 3992 in F1000HC | MDV91-9 | Few |
| 6 | Pleximer: 30% Halloysite in iPP | MDV91-9 | Few |

Examples 7 to 9 and Comparative Example 1

F1000HC (Sonoco) iPP, PP3155 (ExxonMobil Chemical) a 35 MFR iPP, and PP1043N (ExxonMobil Chemical) a 5.3 MFR iPP were blended with 20 wt % elastomer of Exact 5361 (ExxonMobil Chemical). The flex modulus values of the resulting composites were from 1,200 to 1,400 MPa, similar to the value obtained from neat PP7414 (ExxonMobil Chemical), an impact copolymer (ICP) containing 21 wt % ethylene-propylene elastomer.

To prepare a final compound containing 20% PR-24 CNF fibers, F1000HC, PP3155, and PP 1043 were pre-compounded with CNF first at 200° C. using a DSM miniature twin-screw extruder at 100 RPM for 3 minutes. Subsequently, 20 wt % of Exact 5361 was added into these CNF-containing compounds. PP7414, with its pre-dispersed EP elastomer domains, was blended directly with 20 wt % CNF. All final compounds were injection-molded into flex bars for flexure modulus measurements. One flex bar from each sample was cryo-faced using a cryo-microtome at −120° C. to prepare a surface for tapping-phase AFM evaluations of compound morphology.

As indicated in Table 2, the pre-compounding of CNF in PP minimizes the migration of CNF into elastomer domains. Migration into elastomer domains was minimal for Examples 7 to 9 and significant for Comparative Example 1. Additionally, without filler preferential phase partition into the elastomer phase, greater reinforcement of the final compound from CNF fibers can be obtained leading to a higher compound modulus.

TABLE 2

(Examples 7 to 10)

| Examples | Plastic | Elastomer | PP Master Batch | Filler in elastomer phase? | Flex Modulus (MPa) |
|---|---|---|---|---|---|
| 7 | F1000HC | Exact 5361 | Yes | Little | 2,500 |
| 8 | PP1043N | Exact 5361 | Yes | Few | 2,100 |
| 9 | PP3155 | Exact 5361 | Yes | Few | 1,800 |
| 10* | PP7414 | EP | No | Majority | 1,550 |

*not an example of the present disclosure

Examples 11 and 12

Hyperform HPR-803 (Milliken) MOS (magnesium oxysulfate) fibers was first treated with 1% by weight of trimethoxy-vinyl silane whereas the PR-24 (Applied Sciences) carbon nanofibers (CNF) was used as is (without treatment). A Leistriz ZSE 27 mm twin-screw extruder with a 40 L/D ratio was used to prepare PP-fiber master batches. F1000HC iPP was fed along with 40 wt % of the fibers at the first barrel of the extruder. Peroxide, Luperox 101 or 2,5-bis (terbutylperoxy)-2,5-dimethylhexane, was fed at 30 L/D location with 0.75% by weight relative to PP. Peroxide was applied to chain-scission PP for creating radical PP in surface-grafting onto either CNF or vinyl-silane treated MOS.

The master batches thus prepared were subsequently blended with F1000HC iPP and Exact 9361 (ExxonMobil Chemical) ethylene-butene copolymer with a 3.5 MI and a 0.864 g/cc density leading to final compounds with 20% fibers and 20% Exact 9361. The mixing was conducted using a Lestritz ZSE twin-screw extruder with 40 L/D where the Exact 9361 was melt fed by a second Lestritz ZSE twin screw extruder at 16 LID from the die. The mixing temperatures at the main extruder were 160° C. to 180° C. where the Exact 9361 extrusion temperature was set at 150° C. Beside the CNF and MOS fiber master batches, a direct blend of F100HC iPP with 20% Jetfil 700C (Luzenac) 2 micron talc with 20% Exact 9361 was performed. All final compounds were then injection-molded into testing bars for mechanical property measurements and for AFM morphology evaluations.

The AFM results suggested that both CNF and MOS fibers are in the PP phase from the master batch preparation whereas talc was found in the elastomer domains.

Pellets from both CNF/PP and MOS/PP master batches were dissolved in 100 ml xylene in a 350 ml round-bottom flask. The xylene-master batch mix was refluxed at 140° C.

for 20 minutes. The mixture was then visually observed to make sure that master batch pellets had dissolved. Then the hot-dissolved xylene solution was filtered through a sintered glass filter (pore size 4-8 pin) with external heat jacket heat at 180° C. to prevent iPP in the mixture from cooling, solidifying and clogging the filter. Hot xylene was used to wash the filtration unit periodically under high vacuum. The final residual materials on the filter block were dried at 70° C. under vacuum. These residual filler materials were examined by solid state NMR to determine the presence of grafted PP. Additionally, the dissolved PP's from the master batched were checked for their molecular weights by GPC (Gel Permeation Chromotography). Based on the GPC and SSNMR results, the addition of peroxide leads to iPP chain scission with no change in Mn (number average molecular weight) but halving of the Mw (weight average molecular weight) and to PP grafting onto both the CNF and vinyl-silane treated MOS. No PP grafting was detected in MOS without peroxide treatment.

CT (computerized axial tomography) scan with 5-micron spatial resolution was applied to examine the tensile bars of compounds containing 20% CNF and 20% Exact 9361 with and without the peroxide treatment during the CNF-PP master batch preparation. 15 volume percent or more of CNF agglomerates with sizes greater than 5 microns were detected in the compound without peroxide treatment. In the compound that was treated with peroxide during the master batch preparation, only <2 volume percent of CNF agglomerates with sizes greater than 5 microns were found. Hence, the application of peroxide to induce surface-grafting of PP onto fibers greatly enhanced the dispersion of fibers in the final compound.

Comparative Examples 2 to 17

Fiber-reinforced polypropylene/elastomer composites were prepared by direct mixing of all ingredients and without grafting between the fibers and the polypropylene. The composites were then subsequently analyzed with atomic force microscopy (AFM) for the presence of filler in the elastomer phase.

PPAX03B (ExxonMobil Chemical), a polypropylene containing 18% ethylene-propylene elastomer, and Topas 5013 (Topas Advanced Polymers), a random copolymer of ethylene and norborene with 55% ethylene, were compounded with 25 wt % of a final elastomer and 5 wt % of a filler using a Brabender internal mixer. The two elastomers employed were Exact 5361 (ExxonMobil Chemical), an ethylene-octene random copolymer of 0.86 glee density and a melt index (MI) of 3, and Exxelor 1840 (ExxonMobil Chemical), a maleated ethylene-octene copolymer of 0.88 glee density and a MI of 8. The fillers evaluated include PolyStar 400 kaolin clay, calcined 0.7 micron clays from Imeryl, FilmLink 650, 0.7 micron calcium carbonate from Imeryl, XGnP25 graphene, 25 micron wide graphene sheet stack of 10 nm thickness (XG Sciences), Pyrograf PR24 carbon nanofibers (CNF), 0.2 micron diameter carbon fibers (Applied Sciences), and Nanocyl 7000 (Nanocyl) 10 nm diameter multi-walled nanotubes (MWNT).

A dry blend of plastic pellets, elastomer pellets, and filler powder with a total weight of 45 g was first prepared before the dry blend was charged into a Brabender mixer at 200° C. for 5 minutes. The final blend concentration contained 5 wt % filler, 25 wt % elastomer, and 70 wt % PP. The discharge from the Brabender for each sample was then further homogenized using a DSM twin screw miniature extruder for 3 minutes at 200° C. before being injection molded into tensile bars for testing. One tensile bar from each comparative example was cryo-faced using a cryo-microtome at −120° C. to prepare a surface for tapping phase AFM (Atomic Force Microscopy) evaluations of compound morphology.

Based on AFM results, the direct blending of all compound components lead to preferential partition of the fillers into the elastomer phase for each of Comparative Examples 2 to 17 as shown in Table 3. Judging from the AFM images, a majority of the fillers, >60%, appeared inside the elastomer domains.

TABLE 3

| Comparative Examples | Plastic | Elastomer | Fillers | Filler in elastomer phase? |
|---|---|---|---|---|
| 2* | PPAX03B | Exact 5361 | PoleStar Clay | Yes |
| 3* | PPAX03B | Exact 5361 | FilmLink CaCO3 | Yes |
| 4* | PPAX03B | Exact 5361 | XGnP25 Graphene | Yes |
| 5* | PPAX03B | Exact 5361 | PR-24 CNF | Yes |
| 6* | PPAX03B | Exxelor 1840 | PoleStar Clay | Yes |
| 7* | PPAX03B | Exxelor 1840 | FilmLink CaCO3 | Yes |
| 8* | PPAX03B | Exxelor 1840 | XGnP25 Graphene | Yes |
| 9* | PPAX03B | Exxelor 1840 | PR-24 CNF | Yes |
| 10* | Topas5013 | Exact 5361 | PoleStar Clay | Yes |
| 11* | Topas5013 | Exact 5361 | FilmLink CaCO3 | Yes |
| 12* | Topas5013 | Exact 5361 | XGnP25 Graphene | Yes |
| 13* | Topas5013 | Exact 5361 | PR-24 CNF | Yes |
| 14* | Topas5013 | Exxelor 1840 | PoleStar Clay | Yes |
| 15* | Topas5013 | Exxelor 1840 | FilmLink CaCO3 | Yes |
| 16* | Topas5013 | Exxelor 1840 | XGnP25 Graphene | Yes |
| 17* | Topas5013 | Exxelor 1840 | PR-24 CNF | Yes |

*not an example of the present disclosure

PCT and EP Clauses:

1. A fiber-reinforced composite, comprising: a propylene polymer including 90 wt % or more of propylene monomeric units based on the weight of the propylene polymer; a plurality of fibers of a solid, flexible material grafted to the propylene polymer; and an elastomer exhibiting a glass transition temperature of less than 0° C.; wherein the fibers are present in the composite at 10 wt % to 80 wt % based on the total weight of the composite, wherein the propylene polymer is present in the composite at from 30 wt % to 95 wt % based on the total weight of the composite, wherein the elastomer is present in the composite at from 5 wt % to 50 wt % based on the total weight of the composite, wherein greater than 50 wt % of the fibers are dispersed within the propylene polymer based on the total weight of the fibers in the composite.

2. The composite of clause 1, wherein the propylene polymer is polypropylene.

3. The composite of clause 2, wherein the polypropylene is an isotactic polypropylene.

4. The composite of any one of the preceding clauses, wherein the one or more elastomers is selected from diene rubbers, styrene-butadiene rubber, cis-butadiene rubber, natural rubber, polyolefin plastomers, ethylene-butene plastomers, ethylene-hexene plastomers, ethylene-octene plastomers, polyolefin elastomers, propylene-ethylene copolymers, propylene-hexene copolymers, ethylene-octene elastomers, thermoplastic elastomers, hydrogenated styrene-butadiene (or isoprene) block copolymers, polyester, polyamide TPE, and combinations of two or more of the foregoing.

5. The composite of any one of the preceding clauses, wherein the fibers exhibit a diameter of 1 nm to 5 microns.

6. The composite of any one of the preceding clauses, wherein the fibers exhibit an L/D ratio of 30 or more.

7. A process for making a fiber-reinforced composite, comprising: admixing a plurality of fibers of a solid, flexible material into a melt of a propylene polymer including 90 wt % or more of propylene monomeric units based on the weight of the propylene polymer; grafting in the presence of an organic peroxide greater than 50 wt % of the plurality of fibers to the propylene polymer to form a first melt mixture; admixing the first melt mixture to an amount of a melt of an elastomer exhibiting a glass transition temperature of less than 0° C. to form a second melt mixture; and cooling the second melt mixture to form the composite, wherein the fibers are present in the composite at 10 wt % to 80 wt % based on the total weight of the composite, wherein the propylene polymer is present in the composite at from 30 wt % to 95 wt % based on the total weight of the composite, wherein the elastomer is present in the composite at from 5 wt % to 50 wt % based on the total weight of the composite, wherein greater than 50 wt % of the fibers are dispersed within the propylene polymer based on the total weight of the fibers in the composite.

8. The process of clause 7, wherein the propylene polymer is polypropylene.

9. The composite of clause 8, wherein the polypropylene is an isotactic polypropylene.

10. The process of any one of clauses 7 to 9, wherein the one or more elastomers is selected from diene rubbers, styrene-butadiene rubber, cis-butadiene rubber, natural rubber, polyolefin plastomers, ethylene-butene plastomers, ethylene-hexene plastomers, ethylene-octene plastomers, polyolefin elastomers, propylene-ethylene copolymers, propylene-hexene copolymers, ethylene-octene elastomers, thermoplastic elastomers, hydrogenated styrene-butadiene (or isoprene) block copolymers, polyester, polyamide TPE, and combinations of two or more of the foregoing.

11. The process of any one of clauses 7 to 10, wherein the fibers exhibit a diameter of 1 nm to 5 microns.

12. The process of any one of clauses 7 to 11, wherein the fibers exhibit an L/D ratio of 30 or more.

13. The process of any one of clauses 7 to 12, wherein the organic peroxide is selected from the group consisting of benzoyl peroxide, 1,4-dichlorobenzyl peroxide, 2,4-dichlorobenzyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, 1,1-bis(t-butylperoxy)-3,3,5-trimethylcyclohexane, tertiary-butyl-trimethyl peroxide, tertiary-butyl-tertiary-butyl-tertiary-triphenyl peroxide, t-butyl perbenzoate, and combinations of two or more of the foregoing.

14. The process of any one of clauses 7 to 13, wherein prior to grafting the fibers the fibers are surface treated in the presence of a vinyl silane coupling agent.

15. The process of any one of clauses 7 to 14, wherein the vinyl silane coupling agent is selected from methyltrichlorosilane, dimethyldichlorosilane, trimethylchlorosilane, phenyltrichlorosilane, diphenyldichlorosilane, tetramethoxysilane, methyltrimethoxysilane, dimethyldimethoxysilane, ethyltrimethoxysilane, propyltrimethoxysilane, phenyltrimethoxysilane, diphenyldimethoxysilane, tetraethoxysilane, methyltriethoxysilane, dimethyldiethoxysilane, ethyltriethoxysilane, propyltriethoxysilane, phenyltriethoxysilane, diphenyldiethoxysilane, butyltrimethoxysilane, butyltriethoxysilane, isobutyltrimethoxysilane, hexyltrimethoxysilane, octyltrimethoxysilane, decyltrimethoxysilane, hexadecyltrimethoxysilane, trimethyltrimethoxysilane, hexamethyldisilazane, N,O-(bistrimethylsilyl)acetamide, N,N-bis(trimethylsilyl)urea, tert-butyldimethylchlorosilane, vinyltrichlorosilane, vinyltrimethoxysilane, vinyltriethoxysilane, vinyltriacetoxysilane, γ-methacryloxypropyltrimethoxysilane, β-(3,4-epoxycyclohexyl)ethyltrimethoxysilane, γ-glycydoxypropyltrimethoxysilane, γ-glycydoxypropyltriethoxysilane, γ-glycydoxypropylmethyldiethoxysilane, γ-mercaptopropyltrimethoxysilane, γ-chloropropyltrimethoxysilane, and combinations of two or more of the foregoing.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A fiber-reinforced composite, comprising:
a propylene polymer including 90 wt % or more of propylene monomeric units based on the weight of the propylene polymer;
a plurality of discontinuous fibers with an L/D ratio of 30 to 1,500 and a diameter of 1 nm to 0.5 micron of a solid, flexible material grafted to the propylene polymer; and
an elastomer exhibiting a glass transition temperature of less than 0° C.;
wherein the fibers are present in the composite at 10 wt % to 80 wt % based on the total weight of the composite, wherein the propylene polymer is present in the composite at from 30 wt % to 95 wt % based on the total weight of the composite, wherein the elastomer is present in the composite at from 5 wt % to 50 wt % based on the total weight of the composite, wherein greater than 50 wt % of the fibers are dispersed within the propylene polymer based on the total weight of the fibers in the composite.

2. The composite of claim 1, wherein the propylene polymer includes 95 wt % or more of propylene monomeric units based on the weight of the propylene polymer.

3. The composite of claim 2, wherein the propylene polymer is polypropylene.

4. The composite of claim 3, wherein the polypropylene is an isotactic polypropylene.

5. The composite of claim 1, wherein the propylene polymer is present in the composite at from 35 wt % to 75 wt % based on the total weight of the composite.

6. The composite of claim 1, wherein the fibers are present in the composite at from 15 wt % to 60 wt % based on the total weight of the composite.

7. The composite of claim 6, wherein the fibers are present in the composite at from 20 wt % to 50 wt % based on the total weight of the composite.

8. The composite of claim 1, wherein the elastomer is present in the composite at from 15 wt % to 30 wt % based on the total weight of the composite.

9. The composite of claim 1, wherein 80 wt % or more of the fibers are dispersed within the propylene polymer based on the total weight of the fibers in the composite.

10. The composite of claim 1, wherein the one or more elastomers is selected from diene rubbers, styrene-butadiene rubber, cis-butadiene rubber, natural rubber, polyolefin plastomers, ethylene-butene plastomers, ethylene-hexene plastomers, ethylene-octene plastomers, polyolefin elastomers, propylene-ethylene copolymers, propylene-hexene copolymers, ethylene-octene elastomers, thermoplastic elastomers, hydrogenated styrene-butadiene (or isoprene) block copolymers, polyester, polyamide TPE, and combinations of two or more of the foregoing.

11. A process for making a fiber-reinforced composite, comprising:
   admixing a plurality of discontinuous fibers with an L/D ratio of 30 to 1,500 and a diameter of 1 nm to 0.5 micron of a solid, flexible material into a melt of a propylene polymer including 90 wt % or more of propylene monomeric units based on the weight of the propylene polymer;
   grafting in the presence of an organic peroxide greater than 50 wt % of the plurality of fibers to the propylene polymer to form a first melt mixture;
   admixing the first melt mixture to an amount of a melt of an elastomer exhibiting a glass transition temperature of less than 0° C. to form a second melt mixture; and
   cooling the second melt mixture to form the composite,
   wherein the fibers are present in the composite at 10 wt % to 80 wt % based on the total weight of the composite, wherein the propylene polymer is present in the composite at from 30 wt % to 95 wt % based on the total weight of the composite, wherein the elastomer is present in the composite at from 5 wt % to 50 wt % based on the total weight of the composite, wherein greater than 50 wt % of the fibers are dispersed within the propylene polymer based on the total weight of the fibers in the composite.

12. The process of claim 11, wherein the propylene polymer includes 95 wt % or more of propylene monomeric units based on the weight of the propylene polymer.

13. The process of claim 12, wherein the propylene polymer is polypropylene.

14. The process of claim 11, wherein the propylene polymer is present in the composite at from 35 wt % to 75 wt % based on the total weight of the composite.

15. The process of claim 11, wherein the fibers are present in the composite at from 20 wt % to 50 wt % based on the total weight of the composite.

16. The process of claim 15, wherein the elastomer is present in the composite at from 15 wt % to 30 wt % based on the total weight of the composite.

17. The process of claim 11, wherein 80 wt % or more of the fibers are dispersed within the propylene polymer based on the total weight of the fibers in the composite.

18. The process of claim 11, wherein the one or more elastomers is selected from diene rubbers, styrene-butadiene rubber, cis-butadiene rubber, natural rubber, polyolefin plastomers, ethylene-butene plastomers, ethylene-hexene plastomers, ethylene-octene plastomers, polyolefin elastomers, propylene-ethylene copolymers, propylene-hexene copolymers, ethylene-octene elastomers, thermoplastic elastomers, hydrogenated styrene-butadiene (or isoprene) block copolymers, polyester, polyamide TPE, and combinations of two or more of the foregoing.

19. The process of claim 11, wherein the organic peroxide is selected from the group consisting of benzoyl peroxide, 1,4-dichlorobenzyl peroxide, 2,4-dichlorobenzyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, 1,1-bis(t-butylperoxy)-3,3,5-trimethylcyclohexane, tertiary-butyl-trimethyl peroxide, tertiary-butyl-tertiary-butyl-tertiary-triphenyl peroxide, t-butyl perbenzoate, and combinations of two or more of the foregoing.

20. The process of claim 11, wherein prior to grafting the fibers the fibers are surface treated in the presence of a vinyl silane coupling agent.

21. The process of claim 20, wherein the vinyl silane coupling agent is selected from methyltrichlorosilane, dimethyldichlorosilane, trimethylchlorosilane, phenyltrichlorosilane, diphenyldichlorosilane, tetramethoxysilane, methyltrimethoxysilane, dimethyldimethoxysilane, ethyltrimethoxysilane, propyltrimethoxysilane, phenyltrimethoxysilane, diphenyldimethoxysilane, tetraethoxysilane, methyltriethoxysilane, dimethyldiethoxysilane, ethyltriethoxysilane, propyltriethoxysilane, phenyltriethoxysilane, diphenyldiethoxysilane, butyltrimethoxysilane, butyltriethoxysilane, isobutyltrimethoxysilane, hexyltrimethoxysilane, octyltrimethoxysilane, decyltrimethoxysilane, hexadecyltrimethoxysilane, trimethyltrimethoxysilane, hexamethyldisilazane, N,O-(bistrimethylsilyl)acetamide, N,N-bis(trimethylsilyl)urea, tert-butyldimethylchlorosilane, vinyltrichlorosilane, vinyltrimethoxysilane, vinyltriethoxysilane, vinyltriacethoxysilane, γ-methacryloxypropyltrimethoxysilane, β-(3,4-epoxycyclohexyl)ethyltrimethoxysilane, γ-glycydoxypropyltrimethoxysilane, γ-glycydoxypropyltriethoxysilane, γ-glycydoxypropylmethyldiethoxysilane, γ-mercaptopropyltrimethoxysilane, γ-chloropropyltrimethoxysilane, and combinations of two or more of the foregoing.

* * * * *